(12) United States Patent
Kwon et al.

(10) Patent No.: US 10,181,892 B2
(45) Date of Patent: *Jan. 15, 2019

(54) INTERFERENCE CANCELLATION REPEATER

(71) Applicant: SOLiD, INC., Seongnam-si, Gyeonggi-do (KR)

(72) Inventors: Nagwon Kwon, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,102

(22) Filed: Oct. 13, 2017

(65) Prior Publication Data

US 2018/0041266 A1 Feb. 8, 2018

Related U.S. Application Data

(63) Continuation of application No. 15/391,209, filed on Dec. 27, 2016, now Pat. No. 9,813,143.

(30) Foreign Application Priority Data

Dec. 28, 2015 (KR) ........................ 10-2015-0187868

(51) Int. Cl.
*H04B 1/10* (2006.01)
*H04B 7/155* (2006.01)

(52) U.S. Cl.
CPC ................. *H04B 7/15585* (2013.01)

(58) Field of Classification Search
CPC .................................. H04B 7/15585
See application file for complete search history.

(56) References Cited

U.S. PATENT DOCUMENTS

| 5,905,946 A | * | 5/1999 | Lilleberg | H04B 1/7107 370/441 |
| 6,473,415 B1 | * | 10/2002 | Kim | H04B 1/71072 370/342 |
| 8,238,815 B2 | | 8/2012 | Seki | |
| 8,953,725 B1 | | 2/2015 | Lee | |
| 2002/0172265 A1 | * | 11/2002 | Kenney | H04B 1/7107 375/148 |

(Continued)

OTHER PUBLICATIONS

Notice of Allowance issued in U.S. Appl. No. 15/391,209 dated Jul. 10, 2017.

*Primary Examiner* — Dac Ha
(74) *Attorney, Agent, or Firm* — Sughrue Mion, PLLC

(57) ABSTRACT

An interference cancellation repeater for canceling an interference signal included in an input signal including a first adaptive filter configured to generate a first estimated signal; a second adaptive filter configured to generate a second estimated signal; a first scaler configured to scale the first estimated signal based on a first scale factor determined according to a channel state; a second scaler configured to scale the second estimated signal based on a second scale factor determined according to the channel state; a first canceller configured to generate a first interference canceled signal based on the input signal and the scaled first estimated signal; and a second canceller configured to generate a second interference canceled signal based on the first interference canceled signal and the scaled second estimated signal.

12 Claims, 3 Drawing Sheets

(56) References Cited

U.S. PATENT DOCUMENTS

2009/0262853 A1* 10/2009 Yoshida .............. H04B 1/7107
  375/267
2010/0109771 A1   5/2010 Baik et al.
2012/0115412 A1   5/2012 Gainey et al.
2013/0078907 A1* 3/2013 Gore ................ H04B 7/15535
  455/11.1

* cited by examiner

INTERFERENCE CANCELLATION REPEATER

CROSS-REFERENCE TO RELATED APPLICATION

This is a continuation of U.S. application Ser. No. 15/391,209 filed on Dec. 27, 2016, which claims the benefit of Korean Patent Application No. 10-2015-0187868, filed on Dec. 28, 2015, in the Korean Intellectual Property Office, the disclosures of which are incorporated herein in their entirety by reference.

BACKGROUND

1. Field

The inventive concept relates to an interference cancellation repeater.

2. Description of the Related Art

Since a common wireless repeater uses an identical frequency at its input terminal and output terminal, an output signal may be input to the wireless repeater again when an input antenna and an output antenna are not sufficiently isolated from each other, and a multi-path signal generated by reflecting the output signal by an obstacle or a moving object may be input to the wireless repeater again.

If the output signal is input to the wireless repeater again through a feedback channel as an interference signal, a signal quality may deteriorate or the system may oscillate. Therefore, the wireless repeater is required to pre-process and repeat only an original input signal from which the interference signal has been canceled.

Therefore, an interference cancellation repeater has been used which cancels a reflection interference signal and processes only an original input signal for output.

SUMMARY

The inventive concept is directed to an interference cancellation repeater improving interference signal cancellation performance.

Additional aspects will be set forth in part in the description which follows and, in part, will be apparent from the description, or may be learned by practice of the presented embodiments.

According to an aspect of the inventive concept, there is provided an interference cancellation repeater for canceling an interference signal included in an input signal, the interference cancellation repeater includes: a first adaptive filter configured to generate a first estimated signal; a second adaptive filter configured to generate a second estimated signal; a first scaler configured to scale the first estimated signal based on a first scale factor determined according to a channel state; a second scaler configured to scale the second estimated signal based on a second scale factor determined according to the channel state; a first canceller configured to generate a first interference canceled signal based on the input signal and the scaled first estimated signal; and a second canceller configured to generate a second interference canceled signal based on the first interference canceled signal and the scaled second estimated signal.

According to an exemplary embodiment, wherein the first interference canceled signal may be a signal which is generated by canceling some components of the interference signal corresponding to the scaled first estimated signal from the input signal, and the second interference canceled signal may be a signal which is generated by canceling at least some components of the interference signal corresponding to the scaled second estimated signal from the first interference canceled signal.

According to an exemplary embodiment, wherein the first and second scale factors may be adaptively updated as the channel state changes.

According to an exemplary embodiment, wherein the first and second scale factors may have different values.

According to an exemplary embodiment, wherein the first and second scale factors may be each less than one.

According to an exemplary embodiment, the interference cancellation repeater may further include a scaler controller configured to estimate the channel state based on the input signal and an output signal of a digital filter for filtering the second interference canceled signal, and configured to generate the first and second scale factors according to the estimation result.

According to an exemplary embodiment, the interference cancellation repeater may further include a digital filter configured to generate an output signal of a frequency band transmitted to a terminal by filtering the second interference canceled signal.

According to an exemplary embodiment, wherein the first adaptive filter may be configured to generate the first estimated signal based on the first interference canceled signal and the output signal, and the second adaptive filter may be configured to generate the second estimated signal based on the second interference canceled signal and the output signal.

According to another aspect of the inventive concept, there is provided an interference cancellation repeater for canceling an interference signal included in an input signal, the interference cancellation repeater includes: a first adaptive filter configured to generate a first estimated signal; a second adaptive filter configured to generate a second estimated signal; a first scaler configured to scale the first estimated signal based on a scale factor determined according to a channel state; a first canceller configured to generate a first interference canceled signal based on the input signal and the scaled first estimated signal; and a second canceller configured to generate a second interference canceled signal based on the first interference canceled signal and the second estimated signal.

According to an exemplary embodiment, wherein the first interference canceled signal may be a signal which is generated by canceling some components of the interference signal corresponding to the scaled first estimated signal from the input signal, and the second interference canceled signal may be a signal which is generated by canceling at least some components of the interference signal corresponding to the second estimated signal from the first interference canceled signal.

According to an exemplary embodiment, wherein the scale factor may be adaptively updated as the channel state changes.

According to an exemplary embodiment, wherein the scale factors may be less than one.

According to an exemplary embodiment, wherein the interference cancellation repeater may further include a scaler controller configured to estimate the channel state based on the input signal and an output signal of a digital filter for filtering the second interference canceled signal, and configured to generate the scale factor according to the estimation result, According to an exemplary embodiment, wherein the interference cancellation repeater may further include a digital filter configured to generate an output signal of a frequency band transmitted to a terminal by filtering the second interference canceled signal.

According to an exemplary embodiment, wherein the first adaptive filter may be configured to generate the first estimated signal based on the first interference canceled signal and the output signal, and the second adaptive filter may be configured to generate the second estimated signal based on the second interference canceled signal and the output signal.

According to the inventive concept, a plurality of adaptive filters may be stably operated while preventing deterioration in performance, and interference signal cancellation performance can be improved.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
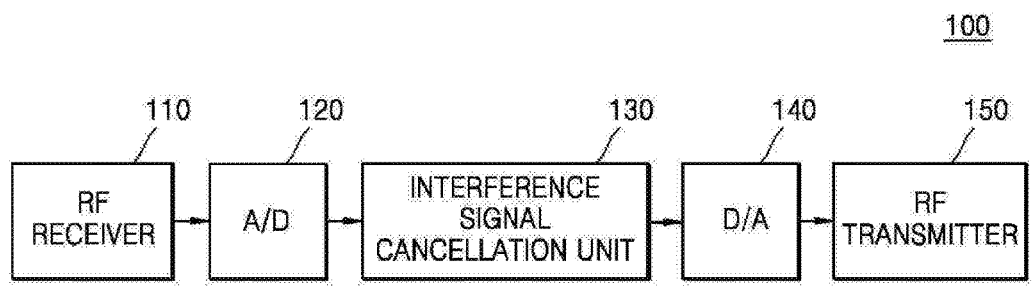
FIG. 1 is a block diagram of an interference cancellation repeater according to an example embodiment of the inventive concept.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (central processing unit), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a block diagram of an interference cancellation repeater 100 according to an example embodiment of the inventive concept.

Referring to FIG. 1, the interference cancellation repeater 100 according to an example embodiment of the inventive concept may repeat communication between a base station and a terminal.

The interference cancellation repeater 100 may include a radio frequency (RF) receiver 110, an analog-to-digital (A/D) converter 120, an interference signal cancellation unit 130, a digital-to-analog (D/A) converter 140, and an RF transmitter 150.

Describing a downlink path as an example, the RF receiver 110 may receive an RF signal from a base station. Furthermore, the RF receiver 110 may receive all or some of an output signal (for example, a repeat signal) transmitted from the RF transmitter 150 in addition to the RF signal. The output signal transmitted from the RF transmitter 150 in addition to the RF signal may function as an interference signal to the RF signal.

The analog-to-digital converter 120 may convert the RF signal to a digital signal.

The interference signal cancellation unit 130 may cancel an interference signal included in the digital signal. For example, the interference signal cancellation unit 130 may generate an inverse-phase estimated signal corresponding to the interference signal included in the digital signal using a plurality of adaptive filters and may add the generated estimated signal to the digital signal to cancel the interference signal.

The digital-to-analog converter 140 may convert the digital signal from which the interference signal has been canceled to an analog signal, that is, an original RF signal.

The RF transmitter 150 may transmit the RF signal to the outside after processing such as amplification. For example, the RF transmitter 150 may transmit the amplified RF signal to a terminal.

As described above, the interference cancellation repeater 100 according to an example embodiment of the inventive concept may cancel an interference signal included in an input signal using the interference signal cancellation unit 130. A specific operation of the interference signal cancellation unit 130 will be described in detail later below with reference to referring to FIG. 2.

Figure 2:
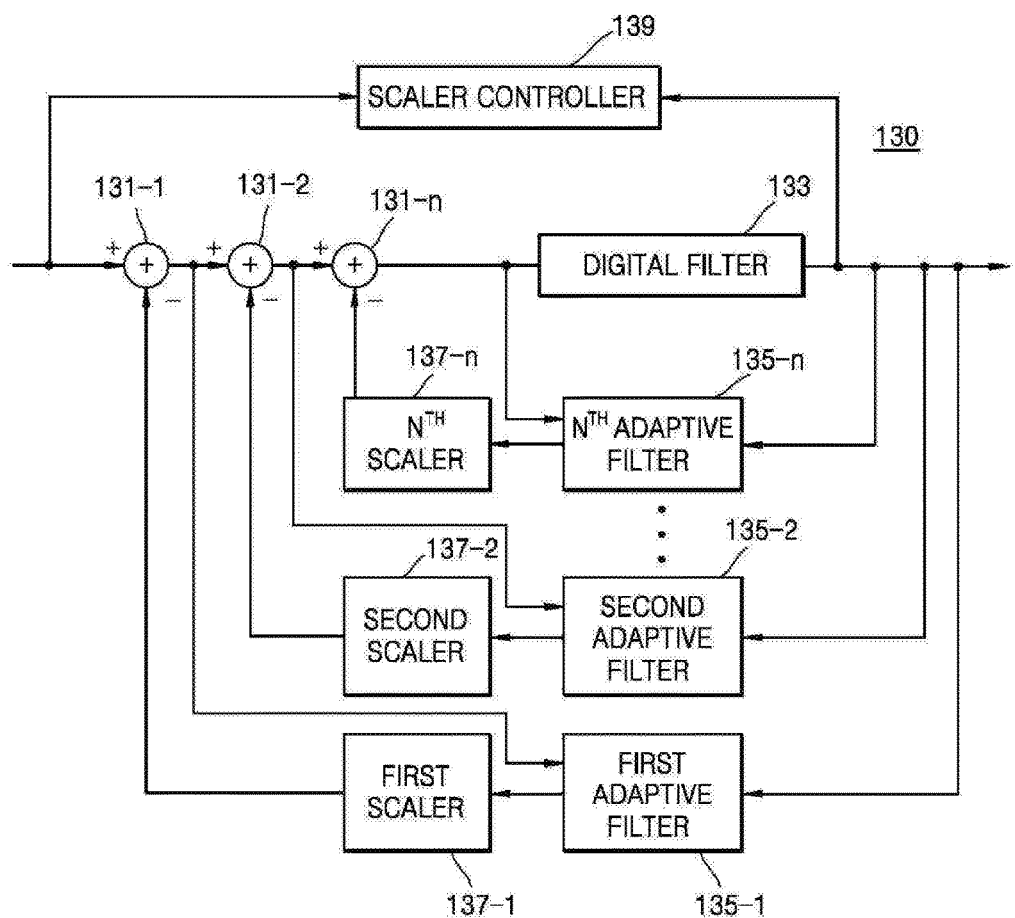
FIG. 2 is a block diagram of an interference signal cancellation unit according to an example embodiment of the inventive concept.

FIG. 2 is a block diagram of an interference signal cancellation unit 130 according to an example embodiment of the inventive concept.

Referring to FIG. 2, the interference signal cancellation unit 130 according to an example embodiment of the inventive concept may include first through $n^{th}$ cancellers 131-1 through 131-n (where n is a natural number of 3 or more), a digital filter 133, first through $n^{th}$ adaptive filters 135-1 through 135-n, first through $n^{th}$ scalers 137-1 through 137-n, and a scaler controller 139. However, the inventive concept is not limited thereto. The interference signal cancellation unit 130 may include two adaptive filters and a canceller and a scaler corresponding to each of the two adaptive filters. Also, depending on an example embodiment, the interference signal cancellation unit 130 may have a smaller number of scalers than the number of adaptive filters.

Hereinafter, for convenience of description, it is assumed that the interference signal cancellation unit 130 includes the first adaptive filter 135-1, the second adaptive filter 135-2, and the $n^{th}$ adaptive filter 135-n, and the number of cancellers and scalers is also n, corresponding to the number of the adaptive filters.

A first canceller 131-1 may generate a first interference canceled signal by combining an input signal and a scaled first estimated signal. For example, the input signal may refer to a signal transmitted from the analog-to-digital converter 120 (see FIG. 1). Here, it is assumed that the input signal is a digital signal including an RF signal and an interference signal. The interference signal included in the input signal may be partially canceled by combining the scaled first estimated signal and the input signal. Here, the fact that the interference signal included in the input signal is partially canceled means that a magnitude of at least some components corresponding to the scaled first estimated signal among various components of the interference signal is reduced or becomes zero. A ratio of the interference signal canceled by the first canceller 131-1 to the entire interference signal may correspond to a degree of scaling of the first scaler 137-1 described later below.

A second canceller 131-2 may generate a second interference canceled signal by combining the first interference canceled signal and a scaled second estimated signal. An interference signal included in the first interference canceled signal may be further partially canceled by combining the scaled second estimated signal and the first interference canceled signal. Here, the fact that the interference signal included in the first interference canceled signal is further partially canceled means that a magnitude of at least some components corresponding to the scaled second estimated signal among various components of the interference signal included in the first interference canceled signal is reduced or becomes zero. A ratio of the interference signal canceled by the second canceller 131-2 to the entire interference signal may correspond to a degree of scaling of the second scaler 137-2 described later below.

The $n^{th}$ canceller 131-n may generate an $n^{th}$ interference canceled signal by combining an n–$1^{th}$ interference canceled signal (in an example of FIG. 2, a second interference canceled signal when n is 3) and a scaled $n^{th}$ estimated signal. The remaining interference signal included in the n–$1^{th}$ interference canceled signal may be completely canceled by combining the n–$1^{th}$ interference canceled signal and the scaled $n^{th}$ estimated signal. Here, the fact that the remaining interference signal included in the second interference canceled signal is completely canceled means that a magnitude of each of various components of the interference signal is reduced to 0, that is, all of the components are canceled. A ratio of the interference signal canceled by $n^{th}$ canceller 131-n to the entire interference signal may correspond to a degree of scaling of the $n^{th}$ scaler 137-n described later below.

The digital filter 133 may filter the $n^{th}$ interference canceled signal transmitted from the $n^{th}$ canceller 131-n. Here, the filtering may be understood as a process of digital signal processing, for example, a signal processing process for canceling at least one frequency band outside a specific frequency band for transmission to the terminal from the $n^{th}$ interference canceled signal.

The $n^{th}$ interference canceled signal filtered by the digital filter 133 may be transmitted to the first adaptive filter 135-1, and the second adaptive filter 135-2 through the $n^{th}$ adaptive filter 135-n. In one aspect, it will understood that an output signal of the digital filter 133 is fed back to the first adaptive filter 135-1, and the second adaptive filter 135-2 through the $n^{th}$ adaptive filter 135-n.

Meanwhile, although not shown in FIG. 2, a delay unit may further be provided between the digital filter 133 and at least one of the first through $n^{th}$ adaptive filters 135-1 through 135-n.

The first adaptive filter 135-1 may generate a first estimated signal using a signal fed back from the digital filter 133, that is, the output signal of the digital filter 133 and an output of the first canceller 131-1, that is, a first interference canceled signal. For example, the first estimated signal may be a signal obtained by estimating at least some of the interference signal included in the input signal.

The first scaler 137-1 may scale the first estimated signal based on a first scale factor that is transmitted from the scaler controller 139 and indicates a scale ratio allocated for the first estimated signal according to a channel state, and thus the scaled first estimated signal may be generated. As a scale of the first estimated signal is adjusted, only some of the interference signal included in the input signal may be canceled by the first canceller 131-1 at a certain rate.

The second adaptive filter 135-2 may generate a second estimated signal using the output signal of the digital filter 133 and an output of the second canceller 131-2, that is, a second interference canceled signal. For example, the second estimated signal may be a signal obtained by estimating at least some of an interference signal included in the second interference canceled signal.

The second scaler 137-2 may scale the second estimated signal based on a second scale factor that is transmitted from the scaler controller 139 and indicates a scale ratio allocated for the second estimated signal according to the channel state, and thus the scaled second estimated signal may be generated. As a scale of the second estimated signal is adjusted, only some of the interference signal included in the first interference canceled signal may be canceled by the second canceller 131-2 at a certain rate.

The $n^{th}$ adaptive filter 135-n may generate an $n^{th}$ estimated signal using the output signal of the digital filter 133. For example, the $n^{th}$ estimated signal may be a signal obtained by estimating at least some of an interference signal included in the n–$1^{th}$ interference canceled signal.

The $n^{th}$ scaler 137-n may scale the $n^{th}$ estimated signal based on an $n^{th}$ scale factor that is transmitted from the scaler controller 139 and indicates a scale ratio allocated for the $n^{th}$ estimated signal according to the channel state, and thus the scaled $n^{th}$ estimated signal may be generated. According to an example embodiment, when the $n^{th}$ estimated signal is a signal generated for canceling interference signals in the last order, the $n^{th}$ scale factor may be set such that all interference signals included in the $n-1^{th}$ interference canceled signal are canceled by the $n^{th}$ canceller 131-$n$ with the scaled $n^{th}$ estimated signal.

Meanwhile, the first through $n^{th}$ adaptive filters 135-1 through 135-$n$ may be implemented by a least mean square (LMS) filter. A detailed operation of the LMS filter is obvious to those of ordinary skilled in the art, and thus, a detailed description thereof will not be given herein. It is apparent that types of adaptive filters that can be implemented according to an example embodiment of the inventive concept do not limit the technical scope of the inventive concept.

The scaler controller 139 may estimate the channel state based on the input signal and the output signal of the digital filter 133. For example, the scaler controller 139 may calculate a magnitude ratio between the input signal and the output signal, and may estimate the channel state, for example, whether a magnitude of a signal input through the channel is changed, or whether the signal is faded. Although FIG. 2 shows that the scaler controller 139 estimates the channel state based on the input signal and the output signal, the inventive concept is not limited thereto. The scaler controller 139 may receive an output of the $n^{th}$ canceller 131-$n$, that is, the $n^{th}$ interference canceled signal, and may estimate the channel state based on the input signal and the $n^{th}$ interference canceled signal.

The scaler controller 139 may generate the first through $n^{th}$ scale factors according to the channel state estimation result. The scaler controller 139 may generate the first through $n^{th}$ scale factors such that scale ratios of the first through the $n^{th}$ estimated signals are different from each other. For example, the scaler controller 139 may generate the first through $n^{th}$ scale factors such that the scale ratios gradually decrease in the order of the first through $n^{th}$ estimated signals or vice versa. In addition, the scaler controller 139 may generate the first through $n^{th}$ scale factors in various combinations. Each of the first through $n^{th}$ scale factors may be less than one.

The scaler controller 139 may adaptively update the first through $n^{th}$ scale factors according to the channel state estimation result. It is for ensuring performance of the first through $n^{th}$ adaptive filters 135-1 through 135-$n$ in response to a change of the channel state.

As described above, the interference signal cancellation unit 130 according to an example embodiment of the inventive concept may completely cancel an interference signal from an input signal using a plurality of adaptive filters. The interference signal cancellation unit 130 adjusts a magnitude of an interference signal to be estimated of the adaptive filters so as not to cause performance degradation of the adaptive filters in response to a change of the channel state so that performance of the adaptive filters may be maintained in an optimum state, and cancellation performance of the interference signal may be improved.

Figure 3:
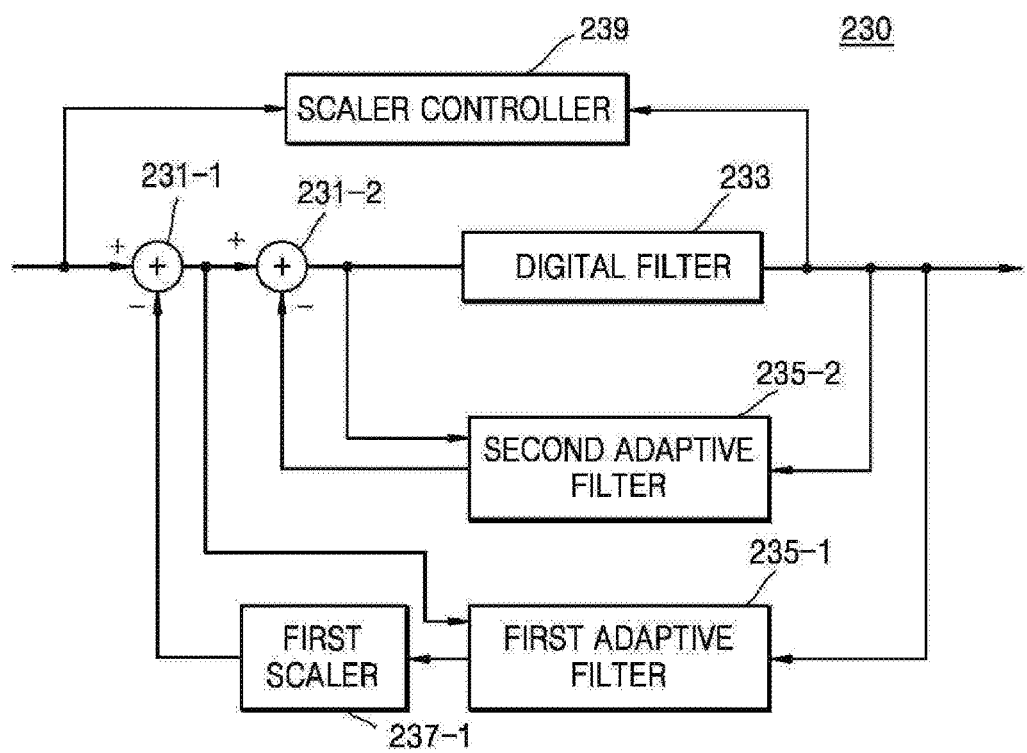
FIG. 3 is a block diagram of an interference signal cancellation unit according to an example embodiment of the inventive concept.

FIG. 3 is a block diagram of an application example of an interference cancellation repeater according to an example embodiment of the inventive concept. The interference signal cancellation unit 230 of FIG. 3 shows an application example in which it is assumed that the interference signal cancellation unit 230 has two cancellers and two adaptive filters and one scaler. In FIG. 3, like elements as those of FIG. 2 are denoted by the same reference numerals, and descriptions thereof will be omitted.

A first canceller 231-1 may generate a first interference canceled signal by combining an input signal and a scaled first estimated signal. The interference signal included in the input signal may be partially canceled by combining the scaled first estimated signal and the input signal.

A second canceller 231-2 may combine the first interference canceled signal and a second estimated signal to generate a second interference canceled signal. The interference signal included in the first interference canceled signal may be completely canceled by combining the second estimated signal and the first interference canceled signal.

A digital filter 233 may filter the second interference canceled signal transmitted from the second canceller 231-2. The second interference canceled signal filtered by the digital filter 233 may be fed back to a first adaptive filter 235-1 and a second adaptive filter 235-2.

The first adaptive filter 235-1 may generate the first estimated signal using a signal fed back from the digital filter 233 and the first interference canceled signal. For example, the first estimated signal may be a signal obtained by estimating at least some of the interference signal included in the input signal.

The first scaler 237-1 may scale the first estimated signal based on a scale factor that is transmitted from the scaler controller 239 and indicates a scale ratio allocated for the first estimated signal according to a channel state, and thus the scaled first estimated signal may be generated. As a scale of the first estimated signal is adjusted, only some of the interference signal included in the input signal may be canceled by the first canceller 231-1 at a certain rate.

The second adaptive filter 235-2 may generate the second estimated signal using the signal fed back from the digital filter 233 and the second interference canceled signal. For example, the second estimated signal may be a signal obtained by estimating at least some of the interference signal included in the first interference canceled signal.

In the interference signal cancellation unit 230 according to an example embodiment of the inventive concept, the second adaptive filter 235-2 may not be connected to a scaler unlike the first adaptive filter 235-1. If a magnitude of a signal to be estimated by the second adaptive filter 235-2, that is, a magnitude of the interference signal included in the first interference canceled signal does not cause deterioration of the second adaptive filter 235-2, then a scaler corresponding to the adaptive filter 235-2 may be omitted.

Figure 4:
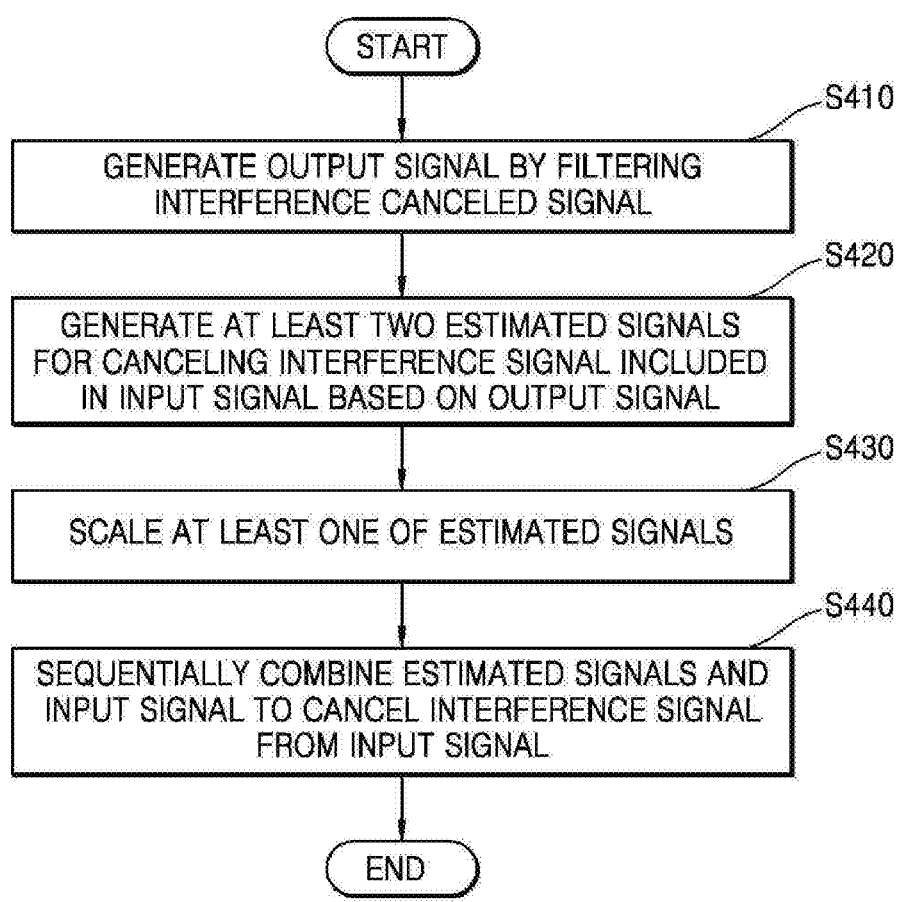
FIG. 4 is a flowchart of a method of canceling an interference signal according to an example embodiment of the inventive concept.

FIG. 4 is a flowchart of a method of canceling an interference signal according to an example embodiment of the inventive concept. In some example embodiments, it should be noted that each of operations shown in FIG. 4 may be performed out of the order shown. For example, successively illustrated operations may be performed substantially concurrently or in a reverse order. The method of canceling an interference signal of FIG. 4 may be performed by the interference cancellation units 130 and 230 described with reference to FIGS. 1 through 3. Hereinafter, a case where the method of canceling an interference signal is performed by the interference cancellation unit 130 will be described as an example.

Referring to FIG. 4, in operation S410, the digital filter 133 may generate an output signal by filtering a signal which is generated by completely canceling an interference signal from an input signal. The output signal of the digital filter 133 may be fed back to the first through $n^{th}$ adaptive filters 135-1 through 135-$n$.

In operation S420, each of the first through $n^{th}$ adaptive filters 135-1 through 135-$n$ may generate an estimated signal based on the output signal. The first adaptive filter 135-1 may generate a first estimated signal based on the output signal and the input signal. The first estimated signal may be an estimated signal to cancel an interference signal included in the input signal. The second adaptive filter 135-2 may generate a second estimated signal based on the output signal and the first interference canceled signal. The second estimated signal may be an estimated signal to cancel the interference signal included in the first interference canceled signal. The $n^{th}$ adaptive filter 135-n may generate an $n^{th}$ estimated signal based on the output signal and an $n-1^{th}$ interference canceled signal. The $n^{th}$ estimated signal may be an estimated signal to cancel an interference signal included in the $n-1^{th}$ interference canceled signal.

In operation S430, the first through $n^{th}$ scalers 137-1 through 137-n may scale an estimated signal output from a corresponding adaptive filter according to a corresponding scale factor. The first scaler 137-1 may scale the first estimated signal based on a first scale factor, the second scaler 137-2 may scale the second estimated signal based on a second scale factor, and the $n^{th}$ scaler 137-n may scale the $n^{th}$ estimated signal based on an $n^{th}$ scale factor.

In operation S440, the first through $n^{th}$ cancellers 131-1 through 131-n may sequentially cancel some of an interference signal using corresponding estimated signals, respectively. The first canceller 131-1 may combine the input signal and the scaled first estimated signal to cancel some of the interference signal, and then may output the first interference canceled signal. The second canceller 131-2 may combine the first interference canceled signal and the scaled second estimated signal to cancel another part of the interference signal, and then may output the second interference canceled signal. Finally, the $n^{th}$ canceller 131-n may combine the $n-1^{th}$ interference canceled signal and the scaled $n^{th}$ estimated signal to cancel the rest of the interference signal, and then may finally output the $n^{th}$ interference canceled signal.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An interference cancellation repeater for canceling an interference signal included in an input signal, the interference cancellation repeater comprising:
    a first adaptive filter configured to generate a first estimated signal based on a first interference canceled signal and an output signal of the interference cancellation repeater;
    a second adaptive filter configured to generate a second estimated signal based on a second interference canceled signal and the output signal;
    a scaler configured to scale the second estimated signal based on a scale factor determined according to a channel state;
    a first canceller configured to generate the first interference canceled signal based on the input signal and the first estimated signal; and
    a second canceller configured to generate the second interference canceled signal based on the first interference canceled signal and the scaled second estimated signal.

2. The interference cancellation repeater of claim 1, wherein
    the first interference canceled signal is a signal which is generated by canceling some components of the interference signal corresponding to the first estimated signal from the input signal, and the second interference canceled signal is a signal which is generated by canceling at least some components of the interference signal corresponding to the scaled second estimated signal from the first interference canceled signal.

3. The interference cancellation repeater of claim 1, wherein
    the scale factor is adaptively updated as the channel state changes.

4. The interference cancellation repeater of claim 1, wherein
    the scale factor is less than one.

5. The interference cancellation repeater of claim 1, further comprising:
    a scaler controller configured to estimate the channel state based on the input signal and the output signal, and generate the scale factor according to the estimated channel state.

6. The interference cancellation repeater of claim 1, further comprising:
    a digital filter configured to generate the output signal transmitted to a terminal by filtering the second interference canceled signal.

7. A method for canceling an interference signal of an interference cancellation repeater, the method comprising:
    generating a first estimated signal based on a first interference canceled signal and an output signal of the interference cancellation repeater;
    generating a second estimated signal based on a second interference canceled signal and the output signal; and
    scaling the second estimated signal based on a scale factor determined according to a channel state,
    wherein the first interference canceled signal is generated based on an input signal and the first estimated signal, and
    wherein the second interference canceled signal is generated based on the first interference canceled signal and the scaled second estimated signal.

8. The method of claim 7, wherein
    the first interference canceled signal is generated by canceling some components of the interference signal corresponding to the first estimated signal from the input signal, and the second interference canceled signal is generated by canceling at least some components of the interference signal corresponding to the scaled second estimated signal from the first interference canceled signal.

9. The method of claim 7, wherein
    the scale factor is adaptively updated as the channel state changes.

10. The method of claim 7, wherein
    the scale factor is less than one.

11. The method of claim 7, further comprising:
    estimating the channel state based on the input signal and the output signal; and
    generating the scale factor according to the estimated channel state.

12. The method of claim 7, further comprising generating the output signal transmitted to a terminal by filtering the second interference canceled signal.

* * * * *